(12) United States Patent
Ortelli

(10) Patent No.: US 6,176,671 B1
(45) Date of Patent: *Jan. 23, 2001

(54) APPARATUS FOR GRIPPING, RAISING, ORIENTING AND TRANSPORTING HELICOPTERS, IN PARTICULAR ON DECKS OF SHIPS

(75) Inventor: Aurelio Ortelli, Bologna (IT)

(73) Assignee: Calzoni S.P.A., Bologna (IT)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/124,439

(22) Filed: Jul. 29, 1998

(30) Foreign Application Priority Data

Jul. 31, 1997 (IT) .............................. MI97A1841

(51) Int. Cl.⁷ ..................................... B64F 1/22
(52) U.S. Cl. ......................... 414/427; 180/904; 244/116
(58) Field of Search .................... 414/426, 427, 414/429; 244/116, 50; 180/904

(56) References Cited

U.S. PATENT DOCUMENTS

| | | | |
|---|---|---|---|
| 3,659,813 | * 5/1972 | Mesnet et al. | 244/116 |
| 3,790,111 | * 2/1974 | Mesnet et al. | 244/116 |
| 3,793,959 | * 2/1974 | Leuenberger | 244/116 X |
| 3,830,452 | * 8/1974 | Seay | 244/116 |
| 5,098,035 | * 3/1992 | Bernard et al. | 180/904 X |
| 5,102,091 | * 4/1992 | Craig | 244/116 |
| 5,248,115 | * 9/1993 | Aurelio | 414/427 X |
| 5,664,743 | * 9/1997 | Ortelli | 244/116 X |
| 5,701,966 | * 12/1997 | Amico | 180/904 X |
| 5,806,795 | * 9/1998 | Ortelli | 414/429 X |
| 6,019,314 | * 2/2000 | Craig | 244/116 X |

FOREIGN PATENT DOCUMENTS 0 661 207 A1    7/1995  (EP) .
21 30949       11/1972  (FR) .

* cited by examiner

Primary Examiner—James W. Keenan
(74) Attorney, Agent, or Firm—Herbert Dubno

(57) ABSTRACT

Apparatus for gripping, raising, orienting and transporting helicopters (102) in particular on decks (101a) of ships (101) provided with longitudinal rails (2) for guiding and constraining the apparatus, which comprises a cross-beam (1) movable in engagement on said rails (2) in a direction parallel to the longitudinal axis (X-X) of the ship, said cross-beam (1) having, mounted on it, a carriage (4) movable parallel to the cross-beam itself (1) and having, hinged with it, an arm (5) at the opposite ends of which the devices (7,8,8e) for gripping and raising the main wheels (102a) of the helicopter (102) are mounted.

8 Claims, 3 Drawing Sheets

APPARATUS FOR GRIPPING, RAISING, ORIENTING AND TRANSPORTING HELICOPTERS, IN PARTICULAR ON DECKS OF SHIPS

FIELD OF THE INVENTION

The present invention relates to an apparatus for gripping, raising, orienting and transporting helicopters, in particular on decks of ships, which comprises a cross-beam, movable parallel to the longitudinal axis (X-X) of the ship, and a carriage movable parallel to the cross-beam itself and having, hinged with it, an arm at the opposite ends of which the devices for gripping and raising the main wheels of the helicopter are mounted.

BACKGROUND OF THE INVENTION

It is known in the art that the widespread use of helicopters on-board ships poses the need for performing transportation of a helicopter from a landing area, provided on the deck itself, to inside a hangar situated on the deck of the ship itself.

This operation, however, is particularly complicated on account of several factors which result in a high degree of unpredictability as regards both the landing position on the deck and the relative position of the helicopter, the deck itself and the hangar entrance; in addition, the manoeuvre must be able to be carried out in total safety, as regards both the helicopter and personnel involved, even in very precarious conditions caused for example by strong winds and/or rough seas, resulting in pitching and rolling of the ship and an unstable equilibrium of the helicopter.

There are also known in the art some solutions which involve the use of a carriage movable, on the deck, in a direction substantially parallel to the longitudinal axis of the ship and to which the helicopter must be hitched up after landing so that the carriage itself is able, by means of suitable devices, to transport the helicopter to the hangar.

Although fulfilling their purpose, these known devices have some limitations particularly with regard to the large dimensions which characterize them and which represent an obstacle for the operations involving checking and maintenance of the helicopter wheels once the helicopter has been brought inside the hangar.

OBJECT OF THE INVENTION

It is an object of the invention to provide a simple and reliable apparatus designed to be hitched up with and raise a helicopter of the wheeled type in order to move it from any position inside a well-defined landing area on the deck of a ship into a position where it is correctly oriented and aligned relative to longitudinal guides provided on the deck of the ship itself, for subsequent transportation towards the hangar, whereby this operation can easily be repeated whatever the relative position of the helicopter within the landing area and the angle thereof with respect to the longitudinal axis of the ship.

Another object is to enable this operation to be carried out with automatic and/or manual control, and without requiring manual operations for fixing the apparatus to the helicopter.

A further object is to provide an apparatus which is very compact and has small dimensions and, once it has entered into the hangar, is able to be disengaged from the aircraft and moved backwards a certain amount so as not to create major obstacles for the movement of persons and objects around the aircraft so as to allow maintenance operations to be carried out both on the various parts of the aircraft and the apparatus itself under cover inside the hangar until the moment of its actual use for recovery of the helicopter or for transportation of the latter towards the take-off grid.

Moreover the apparatus must be able to be easily and rapidly adapted both for the recovery of a helicopter provided with a front directional wheel and for recovery of a helicopter with a rear directional wheel, without the need for substantial modifications thereto.

SUMMARY OF THE INVENTION

These objects are achieved according to the present invention by an apparatus for gripping, raising, orienting and transporting helicopters in particular on ship decks provided with longitudinal rails for guiding and constraining the apparatus itself, which comprises a cross-beam movable on the rails in a direction parallel to the longitudinal axis (X-X) of the ship, said cross-beam having, mounted on it, a carriage movable parallel to the cross-beam itself and having, hinged with it, an arm at the opposite ends of which the devices for gripping and raising the main wheels of the helicopter are mounted.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
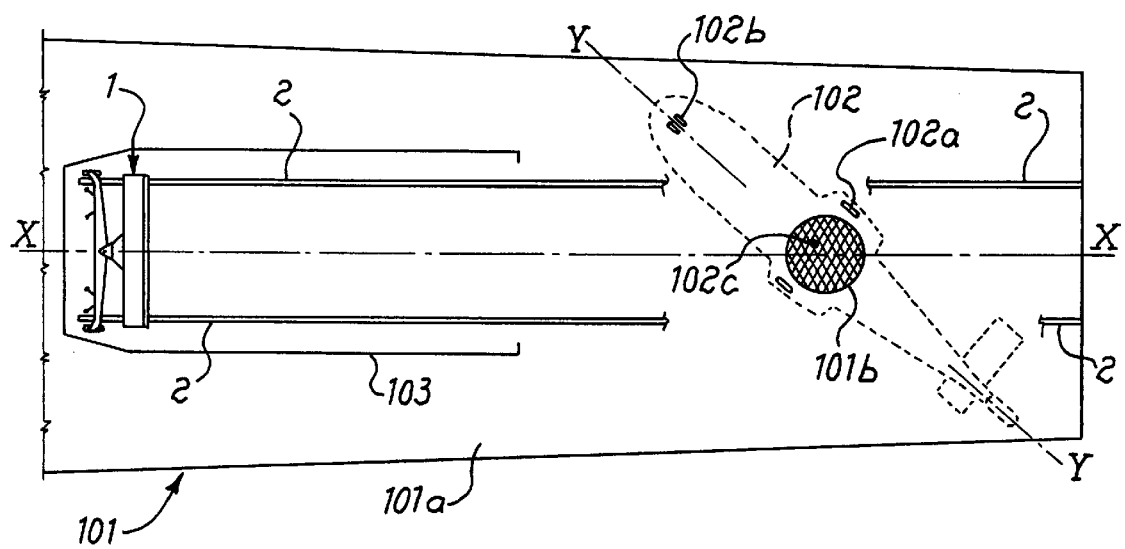
FIG. 1 shows a plan view of a ship provided with the apparatus according to the invention.

As shown in FIG. 1, the deck 101a of the ship 100, whose longitudinal direction is indicated by the axis X-X, is provided with a grid 101b to which the helicopter 102 must be secured by means of a corresponding hitching device with which it is equipped, after landing on the deck of the ship.

Once it has landed and been hitched up to the grid, the helicopter may be in any position inside the grid itself, with its longitudinal axis Y-Y at an angle relative to the longitudinal axis of the ship, with which, instead, it must be parallel in order to be able to be brought inside a hangar 103 provided on the ship's deck.

The ship's deck also incorporates two rails 2 extending parallel to the longitudinal axis X-X of the ship, along its whole length, and arranged so as to pass on the outside and on opposite sides of the grid 101b for hitching up the helicopter.

Figure 2:
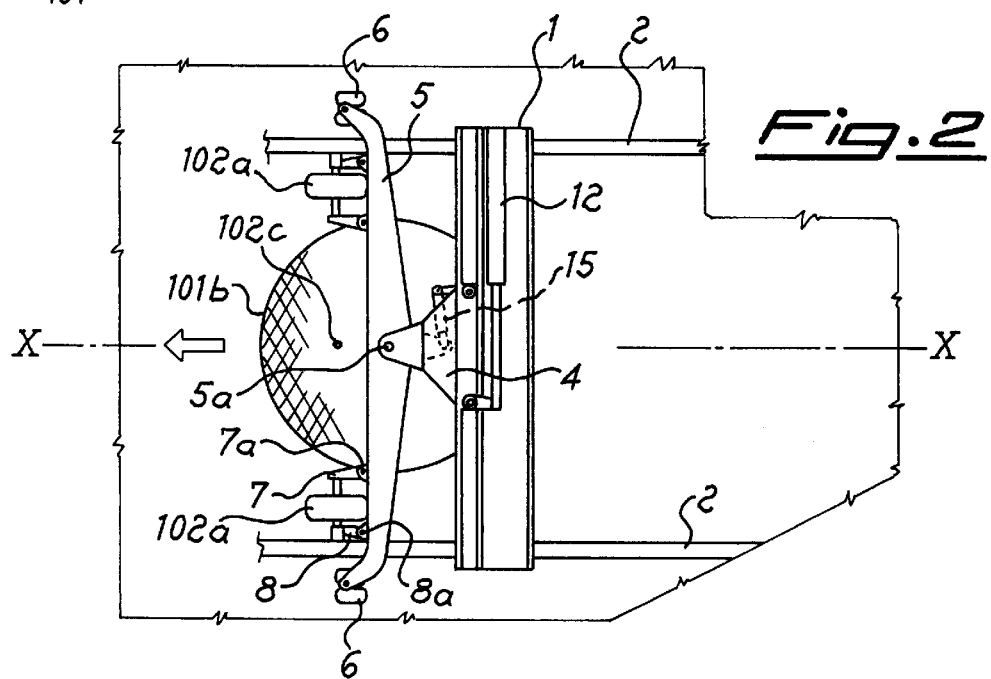
FIG. 2 shows a plan view of the apparatus according to the invention.

The apparatus according to the invention is movable translationwise on said rails 2 and substantially consists of a cross-beam 1 (FIG. 2) on which a carriage 4 is slidable in a transverse direction with respect to the axis X-X of the ship, said carriage 4 in turn carrying a bar 5 hinged with a pin 5a perpendicular to the ship's deck and provided at its opposite ends with pivoting wheels 6 which rest on the deck 101a. The devices 7, 8 for gripping the wheels 102a of the undercarriage of the helicopter 102 are also arranged at said ends of the bar 5.

Figure 3:
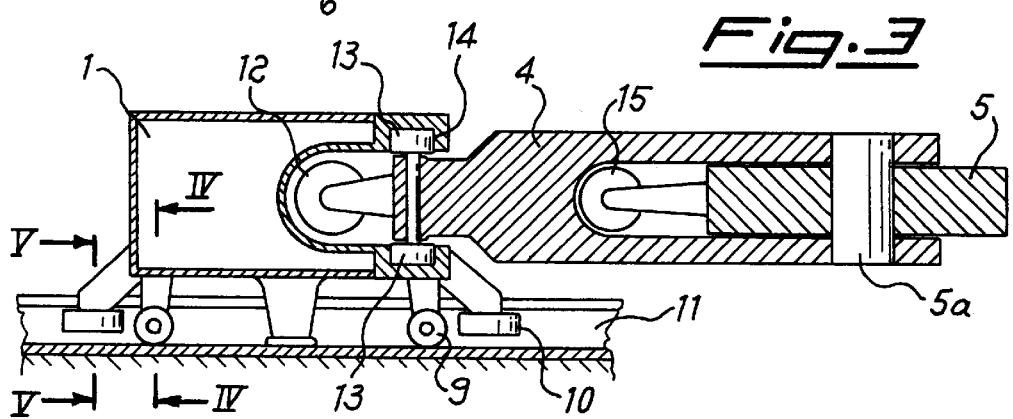
FIG. 3 shows a schematic cross-sectional view of the apparatus according to FIG. 2.
Figure 4:
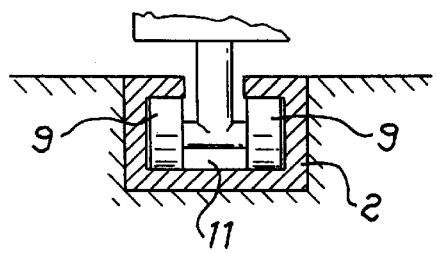
FIG. 4 shows a cross-section along the plane indicated by IV—IV in FIG. 3.
Figure 5:
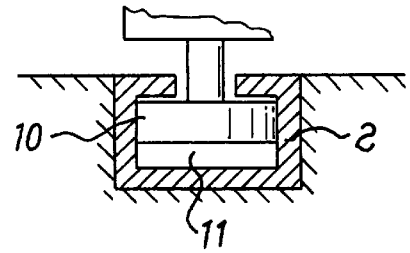
FIG. 5 shows a cross-section along the plane indicated by V—V in FIG. 3.

Constraining of the cross-beam 1 on the rails 2 is performed by means of rollers 9 and 10 (FIGS. 3 and 4) which travel inside the said rails. Drawing of the cross-beam 1 in either direction is performed by means of the cables 11 which are moved by means known per se and not illustrated (for example winches) arranged at the end of said rails.

The carriage 4 moves on the cross-beam 1, parallel to the latter, by means of rollers 13 which run inside appropriate grooves 14 in the cross-beam itself.

The movement of the carriage, however, may also be obtained by means of runners sliding inside the said guides.

A variation of said coupling arrangement may also consist of a sliding runner system instead of the rollers.

Translation of the carriage 4 with respect to the cross-beam 1 is actuated by means of a hydraulic cylinder 12 arranged between the cross-beam and the carriage itself.

Variations of said translation system may also consist either of a cable moved by a suitable winch or by a rack-and-pinion device.

The rotation of the bar 5 with respect to the carriage 4 is actuated and controlled by means of a hydraulic cylinder 15 or other known device.

Figure 6:
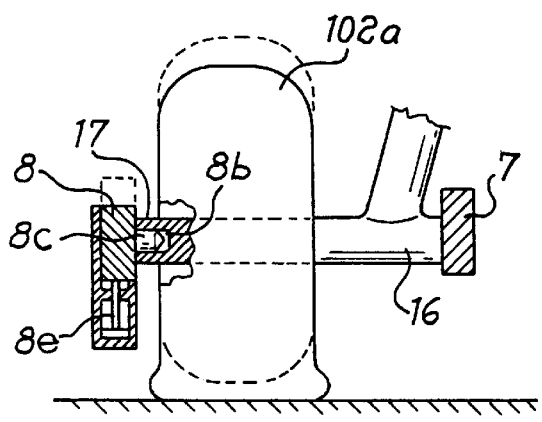
FIG. 6 shows a partially sectioned view of the devices for gripping the wheels of the helicopter.

The devices for gripping the wheels 102a of the helicopter (FIGS. 2 and 6) consist of arms 7 and 8 rotating about respective pins 7a and 8a integral with the bar 5. The rotation of the arms is performed, from an open position, which allows entry of the respective wheel 102a, into a closed position around the wheel itself, and vice versa.

Alternatively it is also envisaged that said arms may be movable between the two said open and closed positions by means of a translatory movement thereof on corresponding slides formed on the bar 5.

While the arm 7 forms a simple support for the inner end 16 of the wheel axle of the aircraft, the arm 8, in addition to forming a support for the outer end 17 of the wheel axle, also has a pin 8c which is inserted into an appropriate hole 8b in the wheel axle.

Figure 7:
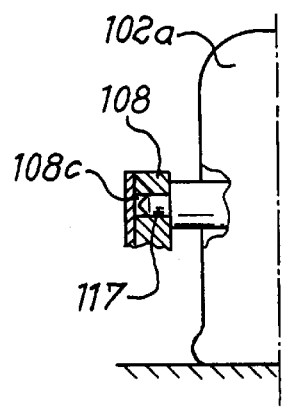
FIG. 7 shows a partially sectioned view of another embodiment of the devices for gripping the wheels.

FIG. 7 illustrates an alternative example of embodiment in which it is envisaged that the arm 108 is provided with a hole 108c into which a pin 117 projecting from the wheel axle of the aircraft is inserted.

In both cases, the arm 8, 108 also has a hydraulic cylinder 8e which, moving upwards, is able to raise the wheel of the aircraft, detaching it from the deck so as to allow manoeuvring of the helicopter.

Operation of the apparatus according to the invention will be described below in connection with a helicopter 102 having a front directional wheel 102b and with consequent gripping of the wheels 102a of the helicopter undercarriage from the rear.

Before decking of the helicopter, the apparatus is brought out of the hangar and transported to the end of the landing deck opposite to that of the hangar itself, thus bypassing the decking grid 101b.

Figure 8A:
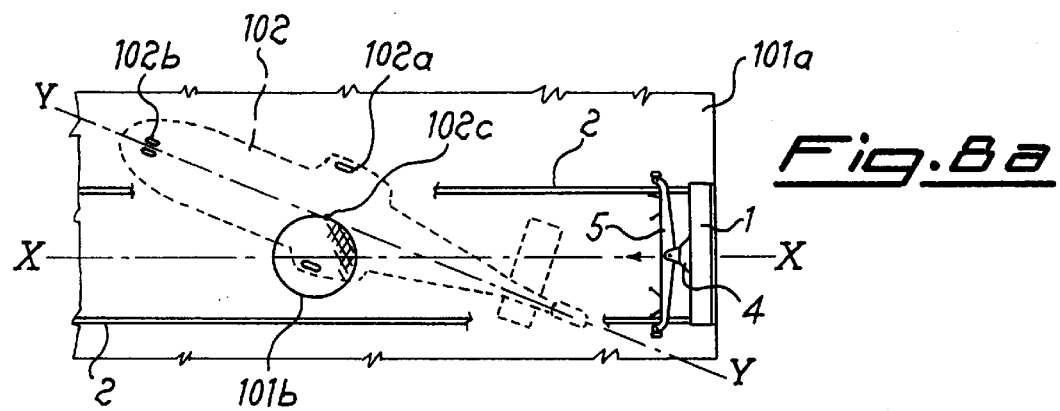
FIGS. 8a–8f show the sequence for gripping, raising, orienting and transferring a helicopter with a front directional wheel to the hangar.

Once the helicopter has been decked and has been secured to the grid 101b by means of its hitching device 102c (FIG. 8a), the cross-beam 1 is brought up towards the helicopter, performing a return movement drawn by the cable 11 and keeping the gripping devices 7 and 8 in the open position.

Figure 8B:
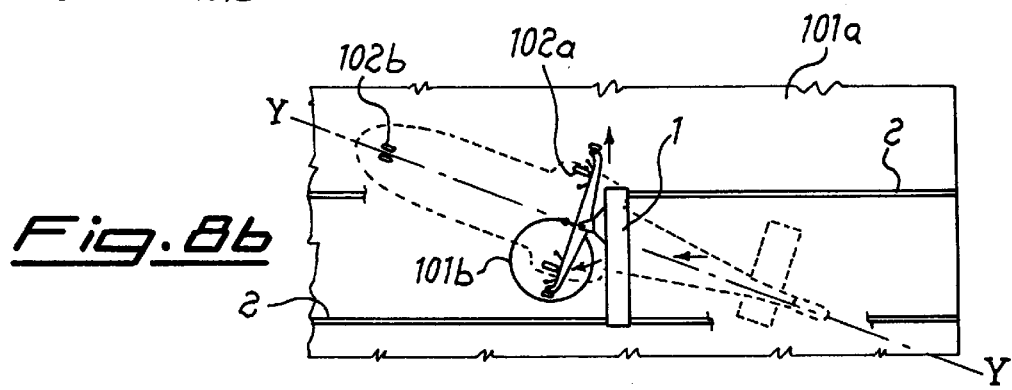

As it approaches the helicopter (FIG. 8b), the carriage 4, movable on the cross-beam 1, is translated laterally and the bar 5 rotated so that the wheels 102a of the helicopter are located in the correct position between the arms 7 and 8.

Figure 8C:
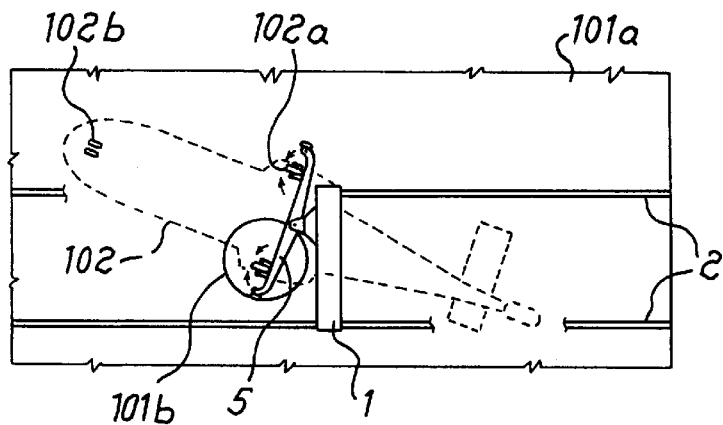

Then (FIG. 8c) the two pairs of arms 7 and 8 are closed around the wheel axles of the aircraft and the pin 8a is inserted inside the hole 8b.

At this point the aircraft is gripped securely by the carriage and may release the hitching device 102c for securing it to the deck.

Figure 8D:
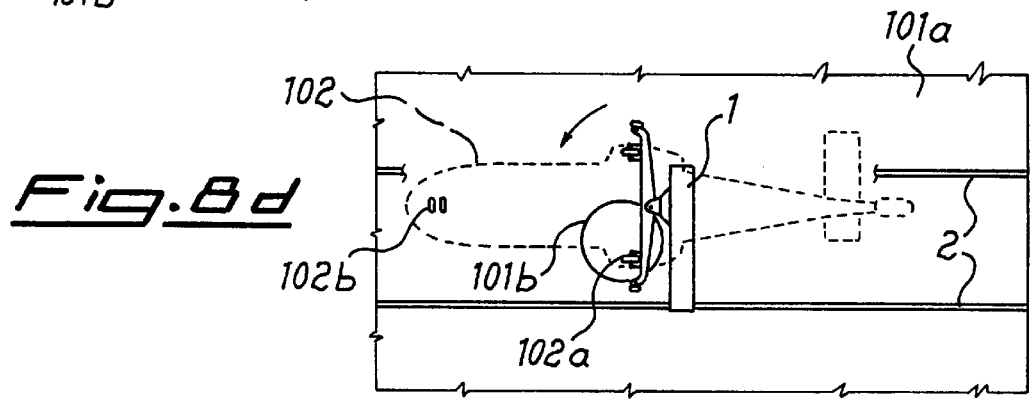

At this point the two hydraulic cylinders 8e are actuated so as to obtain separation of the wheels 102a from the deck and then (FIG. 8d), after rotation of the front directional wheel 102b of the helicopter in the transverse direction, the bar 5 is suitably rotated until it brings the axis Y-Y of the helicopter parallel to the longitudinal axis X-X of the ship.

Figure 8E:
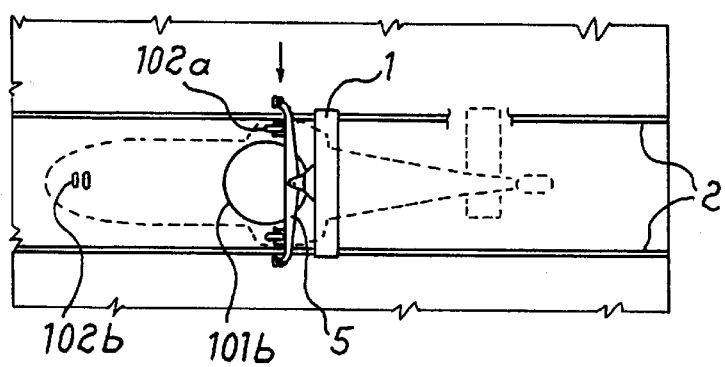
Figure 8F:
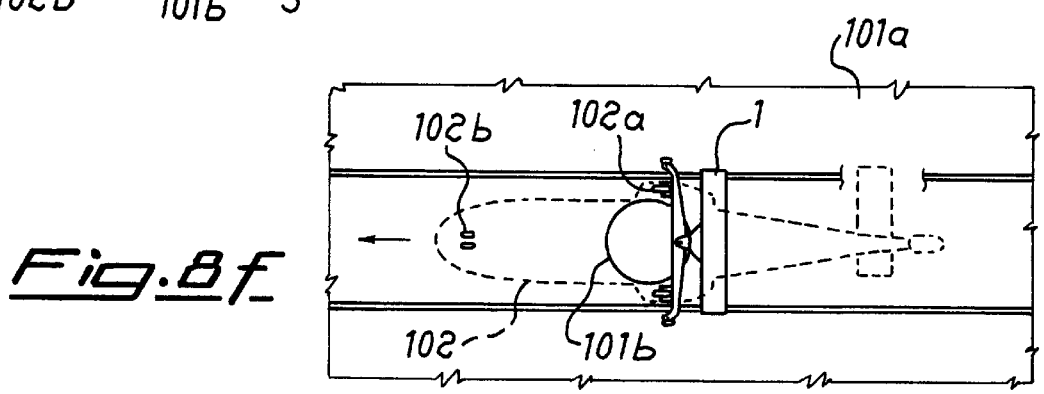

Subsequently (FIG. 8e), the carriage 4 is translated with respect to the cross-beam 1 and brought into the center thereof, thus centring the helicopter with respect to the two rails and the hangar entrance.

After repositioning of the front jockey wheel 102a in the longitudinal direction, the apparatus is translated towards the hangar so as to transport the helicopter inside it.

The apparatus described above refers to a helicopter with a front jockey wheel, but it is obvious that, in the case of a helicopter with a rear jockey wheel, it will be sufficient to arrange the apparatus itself so that it is oriented as a mirror image of that described above so as to make it suitable for manoeuvring a helicopter with a rear jockey wheel.

In this case the apparatus will enter into engagement with the helicopter during its movement out of the hangar, without having to go to the end of the deck and returning as in the previous case.

What is claimed is:

1. An apparatus for gripping, raising, orienting and transporting helicopters on a deck of a ship, comprising:

a hangar on said deck having a width less than a width of the deck;

longitudinal rails on the deck and extending into said hangar;

a cross-beam receivable in said hangar and movable on said rails in a direction parallel to a longitudinal axis of the ship by a cable extending along the rails;

a carriage movable on the cross-beam parallel to the cross-beam;

an arm hinged on the carriage and having opposite ends spaced apart by substantially a length of said cross-beam;

respective devices at the opposite ends of said arm for gripping and raising main wheels of a helicopter;

means for actuating and controlling translation of the carriage relative to the cross-beam and for displacing said carriage and said cross-beam independently of one another, said cross-beam being mounted on said rails by horizontal-axis rollers and vertical-axis rollers, said carriage being mounted on rollers travelling inside corresponding guides of the cross-beam, said arm being rotatable relative to the carriage about a pin having an axis perpendicular to the deck;

means including a hydraulic cylinder for actuating and controlling rotation of the arm with respect to the carriage; and pivoting wheels on each of said ends supporting said ends of said arm on said deck.

2. The apparatus according to claim 1 wherein said means for actuating and controlling translation of the carriage include a hydraulic cylinder.

3. The apparatus according to claim 1 wherein said devices for gripping and raising the wheels of the helicopter consist of a pair of members pivotably mounted on said arm.

4. The apparatus according to claim 3 wherein said members engage with inner and outer parts of a wheel axle of a respective wheel of the helicopter, respectively.

5. The apparatus according to claim 4 wherein at least one of said members has an extension suitable for engagement with a corresponding seat of an axle of a wheel of the helicopter.

6. The apparatus according to claim 4 wherein at least one of said members has a seat for engagement for an extension of an axle of a wheel of the helicopter.

7. The apparatus according to claim 4 wherein at least one of said members has a raising device for lifting the wheels from the deck.

8. The apparatus according to claim 7 wherein said raising device consists of a hydraulic cylinder.

* * * * *